No. 632,660. Patented Sept. 5, 1899.
F. H. RICHARDS.
WEIGHING MACHINE.
(Application filed June 26, 1899.)

(No Model.) 5 Sheets—Sheet 1.

Witnesses:
Chas. F. Schmelz
Geo. H. Hoffman

Inventor:
F. H. Richards

No. 632,660. Patented Sept. 5, 1899.
F. H. RICHARDS.
WEIGHING MACHINE.
(Application filed June 26, 1899.)
(No Model.) 5 Sheets—Sheet 2.

Witnesses:
Inventor

No. 632,660. Patented Sept. 5, 1899.
F. H. RICHARDS.
WEIGHING MACHINE.
(Application filed June 26, 1899.)

(No Model.) 5 Sheets—Sheet 4.

Witnesses: Inventor:

No. 632,660. Patented Sept. 5, 1899.
F. H. RICHARDS.
WEIGHING MACHINE.
(Application filed June 26, 1899.)
(No Model.) 5 Sheets—Sheet 5.

UNITED STATES PATENT OFFICE.

FRANCIS H. RICHARDS, OF HARTFORD, CONNECTICUT.

WEIGHING-MACHINE.

SPECIFICATION forming part of Letters Patent No. 632,660, dated September 5, 1899.

Application filed June 26, 1899. Serial No. 721,858. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus, and especially to a combination of meter and weigher mechanisms adapted for weighing with rapidity and precision grain or other relatively free-flowing materials, the main object of the invention being to first measure approximately complete loads in alternately-dischargeable chambers of a meter and subsequently to deliver such measured loads separately to the independent load receivers or buckets of automatic weighing mechanisms, the difference between the charge delivered by the meter and the full quantity required for a complete load being supplied to the load-receiver by suitable valve mechanism.

Another important object of my invention is to so control the operation of a plurality of buckets that each bucket will be held against descent while it is receiving the load from the meter and until the meter is moved out of operative relation with the bucket into which the supply of material is being delivered.

A further object of my invention is to employ in connection with a pair of automatic weighing mechanisms a valve adapted for supplying material to the buckets thereof alternately and so constructed and organized with respect to the weighing mechanisms that it will be shiftable by each of said mechanisms, respectively, into position for supplying material to the bucket of the other mechanism at a predetermined point in the operation of loading the same.

My invention furthermore has for its object the provision of a register on each of the buckets for recording the number of loads discharged thereby and the provision of an additional register which is operated by either of the registers just mentioned for determining the total number of loads discharged.

Figure 1:
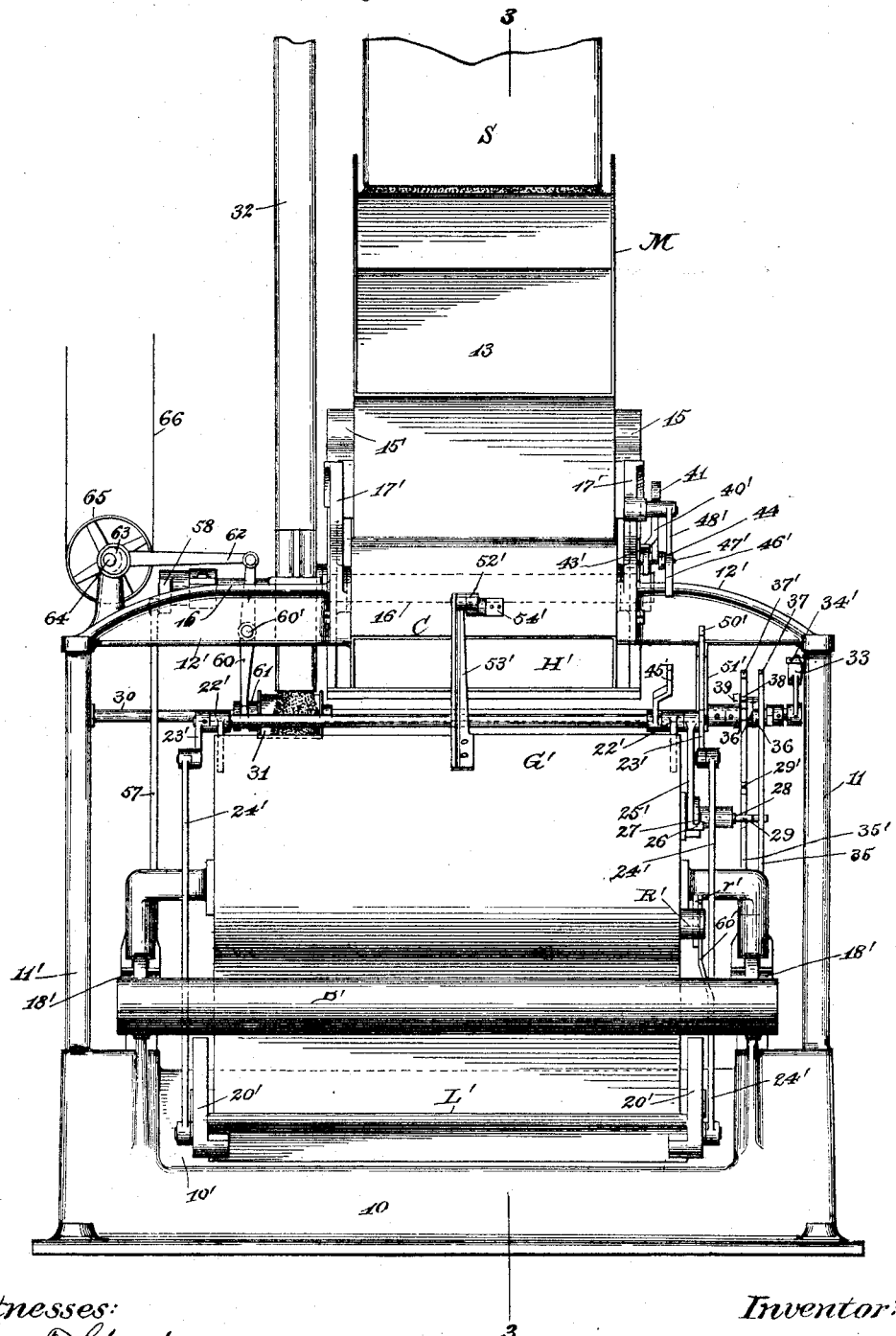
Figure 2:
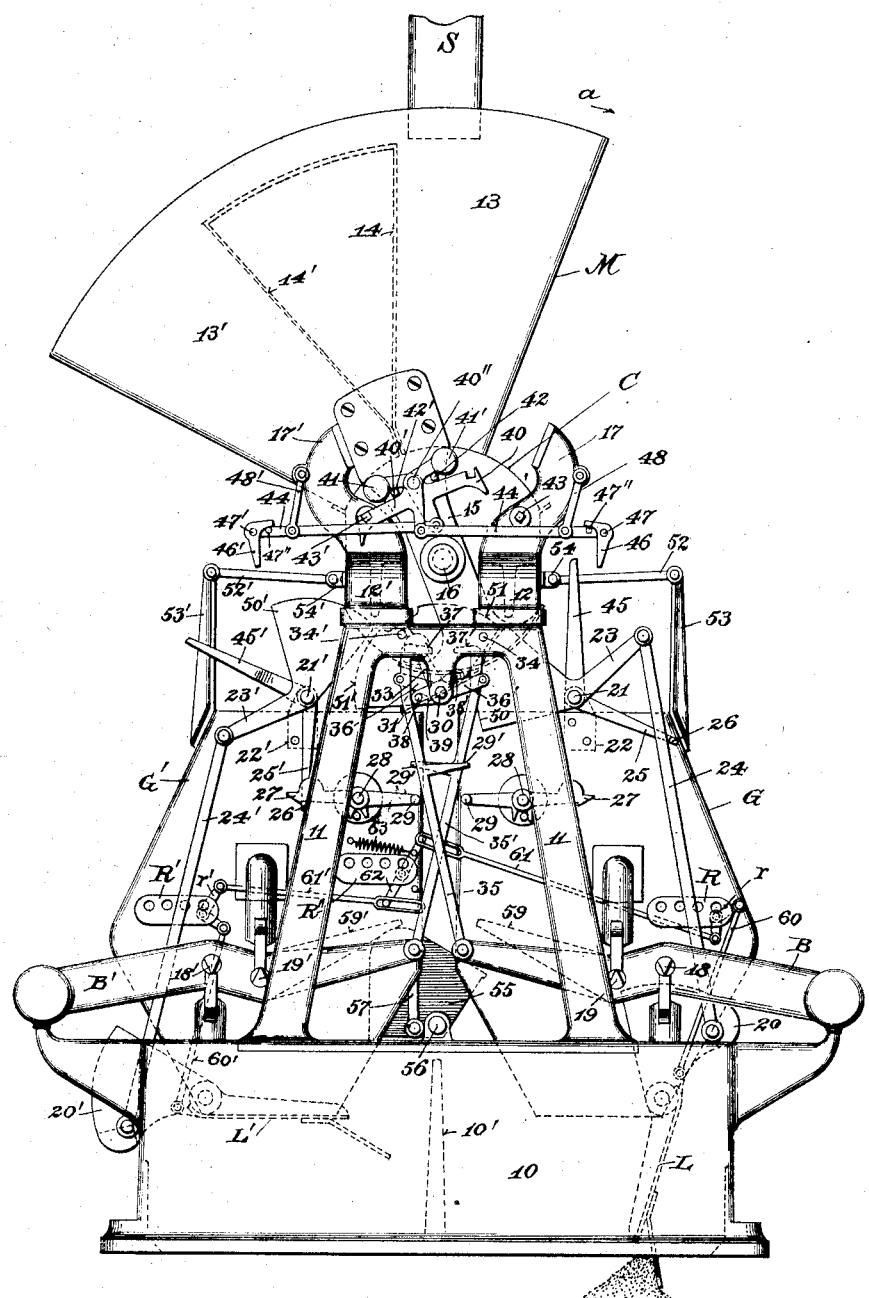
Figure 3:
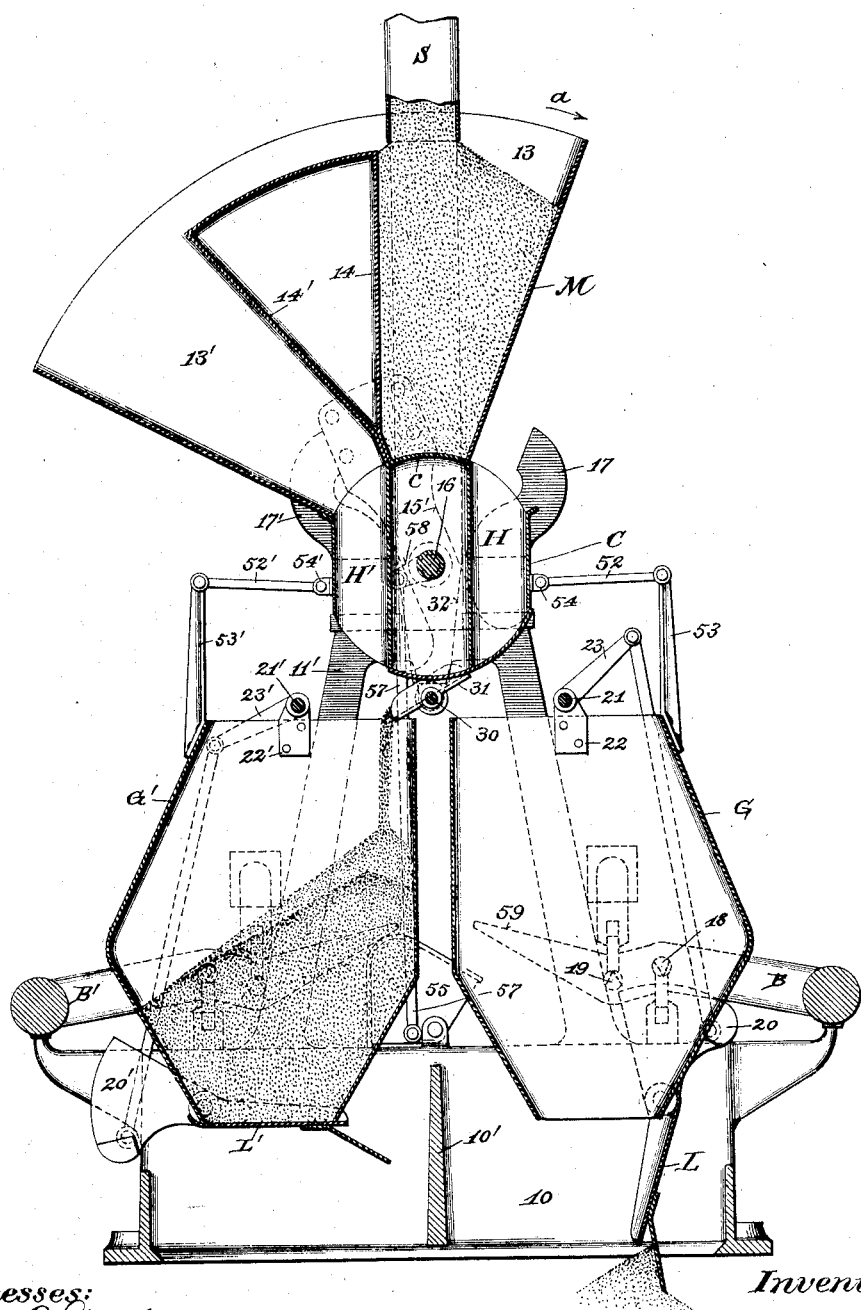
Figure 4:
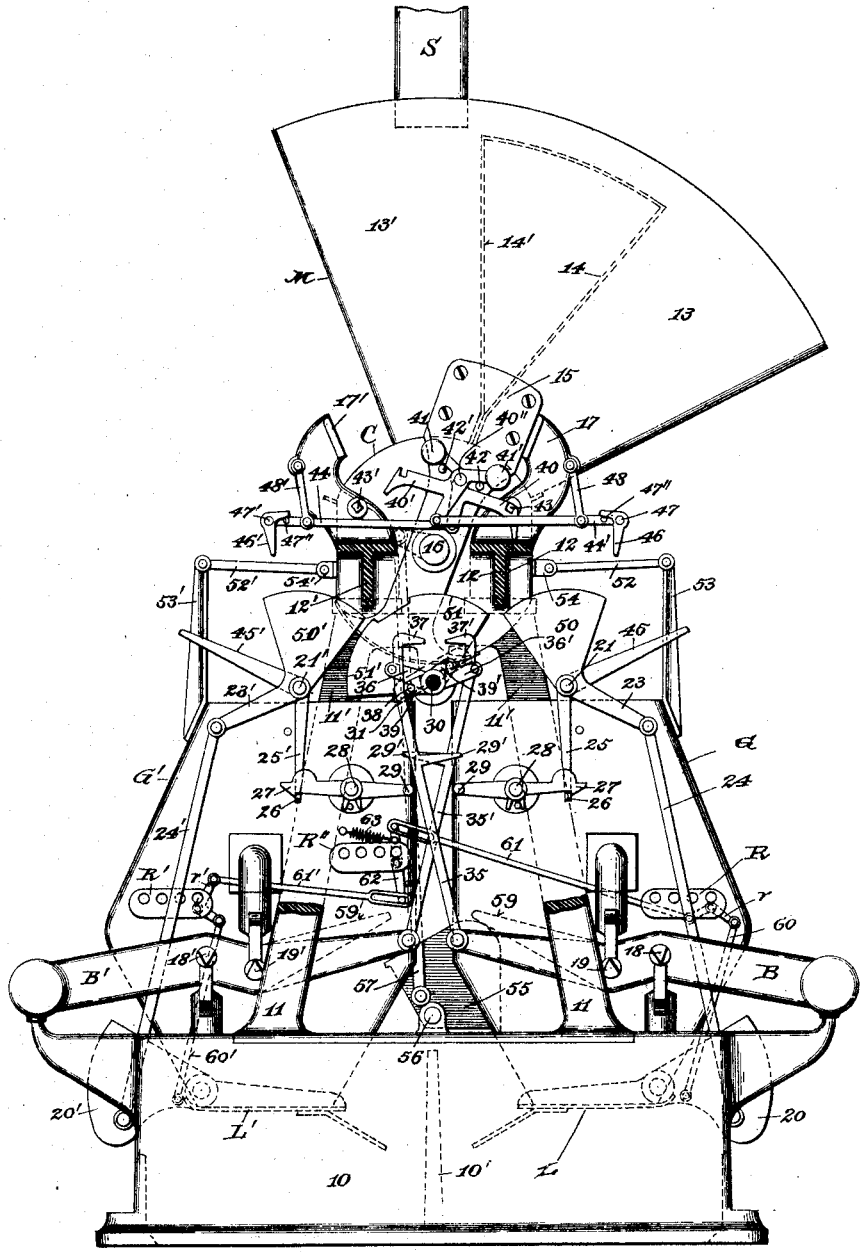
Figure 5:
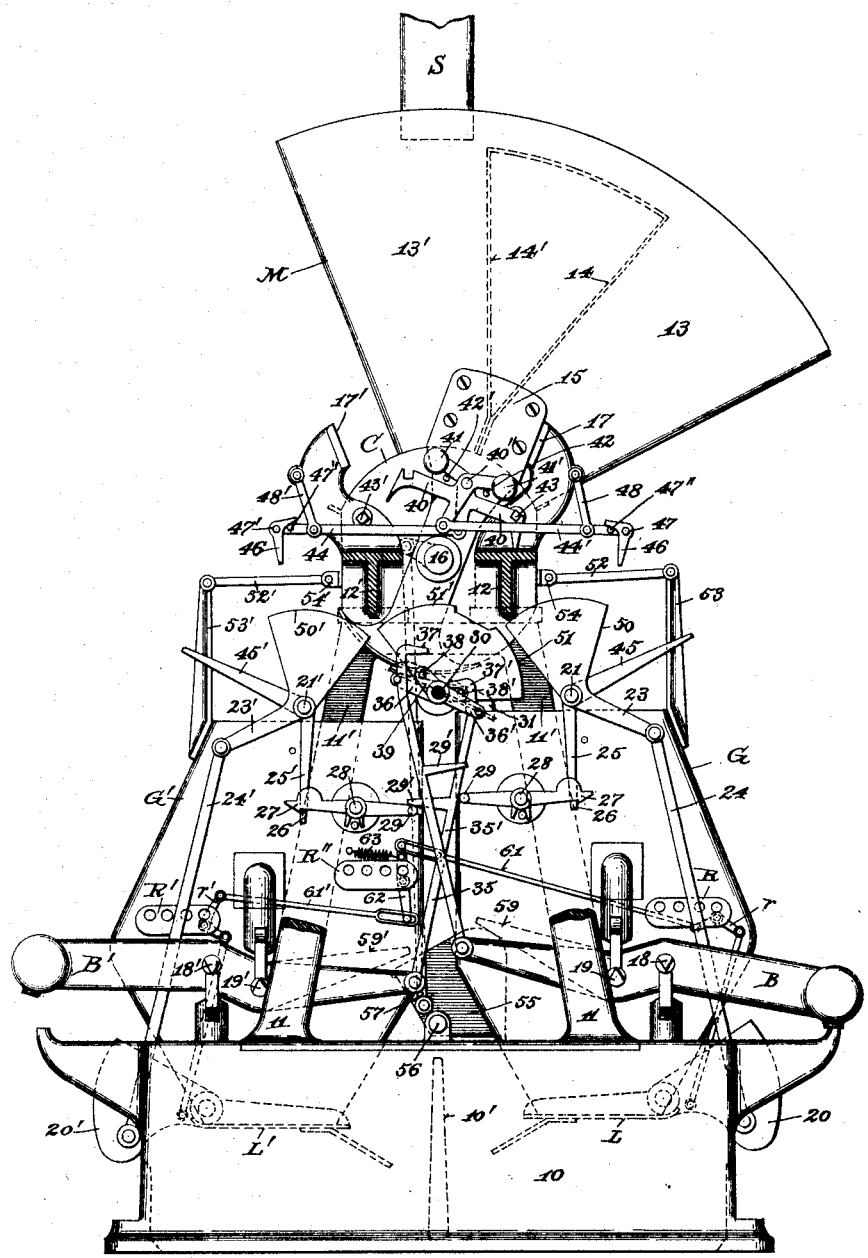

In the drawings accompanying and forming part of this specification, Figure 1 is an end view of the weighing apparatus constructed in accordance with my present invention, looking from the left in Fig. 2. Fig. 2 is a side view of the same, showing the meter and two weighing mechanisms, the mechanism on the right being represented as having discharged its load, while in that on the left the load is being made up. Fig. 3 is a vertical section of the weighing apparatus, taken on line 3 3, Fig. 1. Fig. 4 is a view similar to Fig. 2 and illustrates the positions of the parts after the closer on the right-hand load-receiver has shut and the meter has been permitted to shift, and Fig. 5 is a similar view representing the parts in the positions which they will assume when the load in the left-hand load-receiver has been completed and the closer has just been unlatched.

Similar characters designate like parts in all the figures of the drawings.

The framework for supporting the operative parts of the weighing apparatus may be of any suitable construction and is illustrated embodying a chambered supporting-base 10, having a vertical partition 10' for separating said base into two discharge-chutes, side frames or uprights, (designated by 11 11', respectively,) and top plates or beams 12 12', connecting the side frame 11 11' and supporting the meter and the several parts for operating the same. These top plates are illustrated supporting a casing (designated in a general way by C) having a pair of supply spouts or chutes H H' (see Fig. 3) for directing the supply of material to the buckets of the respective weighing mechanisms and having its upper face concentric with the pivot or axis of the meter, (designated in a general way by M,) said member embodying a pair of chambers 13 and 13', which are separated by walls 14 14', so arranged that the weight of the material entering either of said chambers 13 13' will tend to tilt the meter M into the proper position for discharging the load measured in each of said chambers.

The meter M is provided with the supporting-arms 15 15', mounted on a shaft 16, journaled in the casing C, and the oscillatory movement of said meter is limited by the abutments 17 17', arranged at opposite sides of the meter M and secured to or forming part of the top bars 12 12'.

The load-receivers of the weighing mechanisms are designated by G G', respectively, and are supported by means of beams B B', having knife-edges 18 18', and supporting the load-receivers by knife-edges 19 19', respectively. The load-receivers are provided with load dischargers or closers (designated by L L', respectively,) having counterweights 20 20' for causing said closers to shut after the material has been discharged from the load-receivers. At the upper ends of the load-receivers G G' are transverse shafts 21 21', mounted in bearings 22 22', secured to the load-receivers and having mounted thereon arms 23 23', which are connected by means of rods 24 24' with the closers L L', respectively, so that when the closers turn on their pivots the shafts 21 21' will be oscillated, as will be readily understood. Likewise it will be seen that when the shafts 21 21' are prevented from oscillation the closers L L' cannot move, and to this end arms 25 25' are provided on the shafts 21 21', respectively, each of said arms having a projection 26 to be engaged by a latch 27, pivoted at 28 to the side of the load-receiver, and also having a pin 29, adapted to be engaged by a member 29', which is movable with the beam mechanism and which when the load-receiver has received its full supply will descend with said beam mechanism and unlatch the closer to permit the material in the load-receiver to be discharged therefrom.

Arranged below the casing C and transversely of the weighing apparatus is a shaft 30, which is journaled in ears formed on the side frames 11 11', and having near one end thereof a valve 31, which in the present instance constitutes a drip-valve for completing the load in each load-receiver after the metered load has been deposited therein. Material is supplied to said valve continuously through a chute 32, and according to the position of the valve 31 the drip-stream will be caused to flow into the load-receiver G or G', as the case may be. Near its right end the shaft 30 carries a weighted lever 33, moving between two stop-pins 34 34' on the frame 11 and adapted to hold the valve 31 in its position properly to supply the drip-stream to either of said load-receivers until its reversal is effected to guide said stream into the other load-receiver. This reversal is accomplished by means of any suitable connections, (shown as the links 35 35', respectively,) although other devices may be employed, the link 35 being pivotally held with its lower end on one of the arms of the beam B and being guided near its upper end by a link 36, one end of which is loosely supported on the shaft 30, above mentioned. The upper end of the link 35 has a projection or hook 37, which is adapted to engage on its downward travel with the front end of the beam B a pin 38, projecting from an arm 39, rigidly secured to the valve-shaft 30. In a like manner to that just described one of the arms of the beam B' carries the lower end of the link 35', the upper end of which is guided by a link 36', similarly pivoted on the shaft 30, and which at its upper end has a projection or hook 37', adapted to engage a pin 38', projecting from an arm 39', also rigidly secured to the shaft 30. Hence it will be seen that when the load-receiver G descends, and with it the forward end of the beam B, the projection or hook 37 will be brought into contact with the pin 38, and will then rock the valve-shaft 30 sufficiently to permit the weighted lever 33 to gravitate toward the stop-pin 34, and thus move the valve 31 into the position shown in Figs. 2 and 3, thus directing the drip-stream to and completing the load in the load-receiver G', which will then descend and, by means of the link 35' and projection or hook 37' engaging the pin 38', will cause said valve-shaft 30 to rock until the weighted lever 33 gravitates toward the pin 34', and thus cuts off the drip-stream from the load-receiver G' and directs said drip-stream into the load-receiver G for the purpose of completing the load therein.

In addition to the oscillatory movement just described I prefer to provide means for axially reciprocating or shaking the valve 31, this shaking movement being imparted in the present instance by means of an oscillating lever 60, (see Fig. 1,) pivoted at 60' to one of the top plates 12' of the machine and having its free end engaging a groove in an enlarged hub 61, extending from the valve, movement being imparted to said lever by means of a rod 62 and eccentric 63, the latter being mounted upon a shaft 64, to which rotary movement is imparted by a pulley 65 and belt 66.

The meter M oscillates, as above mentioned, around the axis of and with the shaft 16 and has material supplied thereto through a chute S, the lower end of which is so positioned relatively to the meter M that the amount of material in the respective meter-chambers is governed thereby. The discharge-opening of the chamber receiving a meter-load from the supply-chute S is closed by a valve c, which is curved concentrically with the axis of the meter-supporting shaft 16, so that when either chamber 13 13' is brought to a position beneath the chute S to be filled therefrom the discharge-opening of said chamber will be tightly closed and all leakage or waste of material therefrom will be avoided.

Referring to Fig. 3, the chamber 13 is shown full and a further supply of material from the chute S is stopped, the main portion of the load in said chamber being on the right of said chute, and thus tending to oscillate the meter M in the direction of the arrow $a$ on the same figure whenever the meter M shall be liberated. It will also be seen that in the load-receiver G' the load is being completed by a drip-stream from the valve 31.

Means are provided for locking the meter M in position and against premature reversing movement, such means consisting, substantially, of two latches 40 and 40', which are pivoted on a stud 40'', arranged on the side arm 15 of said meter. The latches 40 40' are counterweighted, as indicated at 41 41', and will come to points of rest against stop-pins 42 42', secured to the arm 15, said weights tending to throw the latches 40 40' into engagement with the lock-pins 43 43', projecting from the abutments 17 17', the ends of said pins being preferably squared, as shown in Fig. 2. The lock-pin 43' serves to retain the meter M in position and against oscillation until said latch 40' is positively withdrawn from the lock-pin 43' by a link 44', the movement of which is controlled by the load-discharger L on the load-receiver G, as follows: Mounted upon the shaft 21 is an arm 45, the outer end of which is adapted to engage a suitable device, such as a by-pass lever 46, which is pivoted at 47 to the link 44' and normally rests against the stop-pin 47'', so that when the load-discharger L on the load-receiver G shuts the arm 45 will strike the by-pass 46, and thus move the link 44' (suspended at one end by a link 48) bodily toward the right, thus withdrawing the latch 40' from the lock-pin 43' and permitting the material in the chamber 13 to oscillate the meter M toward the right until its movement is stopped by the abutment 17, when the discharge-opening of the chamber 13 will be in line with the chute H and the metered load in said chamber 13 will be discharged into the load-receiver G, while the chamber 13' will receive a new meter-load from the chute S, the load in the load-receiver G' being completed by the drip-stream passing from the chute 32 and controlled by the valve 31. When the load in said load-receiver G' has been completed, as just stated, the closer L' will be unlatched and the load discharged, the arm 45', connected with the closer L' through the shaft 21', being brought into a position where upon the closing movement of said closer it may engage the by-pass 46', and thus move the link 44, which is suspended by a link 48', bodily toward the left, and thus disengage the latch 40 from the lock-pin 43, thereby permitting the meter M to oscillate toward the left and bring the discharge-opening of the chamber 13' into alinement with the chute H', through which another meter-load may then be discharged into the load-receiver G'. It should be remembered that during the descent of the load-receiver G' the link 35', connected to beam B', is also caused to descend, thereby rocking the valve 31 to direct the drip-stream into the load-receiver G, and it will therefore be seen that while the load in the load-receiver G' is being discharged a new load for it is being simultaneously prepared in the meter M, the load in the load-receiver G being then in process of completion by the drip-stream from the valve 31.

Means are provided whereby the opening of the closer L' is prevented when the drip-valve 31 is in a position to permit the entrance of material in the load-receiver G', such means consisting of a segment 50' on the shaft 21' and shown in the present instance as forming part of lever 23', said segment 50' being in alinement with a segment 51', which is attached to the shaft 30, and both of said segments being so arranged that the closer L' cannot open as long as the drip-valve 31 is discharging material into the load-receiver G'. The valve 31 and the closer L are similarly interlocked by the segments 50 and 51, the interlocking segments forming, in the manner described, limiters which are reciprocally effective for the respective valve-opening and closer-opening movements. In order properly to guide the upper ends of the load-receivers G and G', links 52 52' are provided and secured at their outer ends to brackets 53 53', while their inner ends are pivoted to brackets 54 54', respectively, secured to the ends of the casing C.

It has been found in practice that when a metered load is discharged into a load-receiver the impact of said load is sufficient to overbalance the beam-weight, thereby causing the load-receiver to descend and the load to be discharged therefrom prematurely and without having its true and required weight. For this reason I provide means whereby the descent of the load-receiver during the discharge of a metered load is prevented, such means consisting of a blocking member 55, pivoted to the base 10 of the apparatus, as at 56, and connected by means of a link 57 with an arm 58, which is secured upon the shaft 16, whereby the position of the blocking member 55 is governed by the position of the meter M, and said blocking member 55 is adapted alternately to engage the extensions 59 59', which form parts of the beams B B' of the weighing mechanisms.

In Fig. 2 of the drawings the blocking member 55 is shown in engagement with the extension 59' of the beam B', and said member will remain in this position until the meter M is permitted to occupy its reversed position after the shutting of the closer L of the load-receiver G. The material in the meter-chambers is discharged into the respective load-receivers in a comparatively short space of time. Likewise the discharge of the material from the load-receivers occupies but very little time, while, on the other hand, the completion of the load by the drip-stream proceeds more slowly to allow ample time for the discharge of the material in the load-receiver G and the return of the closer L thereof and the subsequent unlatching and reversal of the meter M before the load-receiver G' will commence to descend on account of the drip-stream completing the required load therein.

The load-receivers G and G' are provided with registers R R', connected by means of links 60 60' with the closers L L', respectively, in such a manner that the registers R R' are operated to indicate a load upon each opening movement of their respective closers, and the operating-arms $r\ r'$ of the registers R R' are made in the form of angle-levers, connected by slotted links 61 61' to a centrally-pivoted lever 62, by which the register R" (shown supported on load-receiver G') is operated, said lever 62 being returned to its normal position by a spring 63, and hence it will be seen that said register R" is operated by the movement of either of the levers r r', and consequently will indicate the combined number of loads discharged from the load-receivers G and G', as individually indicated by the registers R and R'.

The operation of a weighing apparatus constructed in accordance with my invention as herein set forth is as follows: It being assumed that the parts are in the position shown in Figs. 2 and 3, it will be seen that the compartment 13' of the meter M has delivered its charge through the delivery-spout H' into the bucket G' and that the chamber 13 of the meter, the discharge end of which is closed by the valve c, is being filled from the main spout S; also, that the supplemental valve 31 is delivering a drip-stream into said bucket G'. The bucket G is represented in these views having just discharged its load. At this time the meter-latch 40' is in engagement with the stop or detent 43', the load-discharging-movement limiter 51' is in position to be engaged with the rocker 50' and prevent the opening of the closer L', and the blocking-segment 55 is in engagement with the beam-arm 59' and forms a positive abutment for preventing the descent of the same, while the limiter 51 is held against oscillation by the rocker 50 of the weighing mechanism G until the closer L of the same is shut. As soon as the closer L is shut the rocker 50 is carried to the position shown in Fig. 4 and the stop-segment 51 will be free to turn and therewith the drip-valve 31, with which it moves in unison. The oscillation of the rocker 50 to the position shown in Fig. 4 causes the arm 45 to strike the stop 46 and throw the link or connecting-rod 44' to the right, thereby releasing the meter-latch 40' from engagement with the detent 43', whereupon the weight of the charge in the compartment 13 of the meter will cause said meter to tilt to the right and the meter-latch 40 to be engaged by the detent 43, as shown in said Fig. 4. The oscillation of the meter causes the blocking-segment 55 to be withdrawn by the rod 57 from engagement with the beam-arm 59', and said blocking member is then moved into position to block the descent of the beam B by engaging the under side of the arm 59 thereof. The beam mechanism B' is now free, and the weight of the load in the bucket G', when completed by the drip-stream, will now cause said bucket and the poising portion of its beam mechanism to descend. When the meter oscillates toward the right, the charge in the compartment 13 thereof is permitted to pass out through the delivery-spout H, but the supply to the bucket G' from the supplemental valve 31 is not cut off. The drip-stream supplied by the valve 31 continues to flow into the bucket G' during the descent of the poising mechanism of said bucket G' and until the arm or projection 37' engages the stop 38', connected with the valve-shaft 30, whereupon the supplemental valve 31 is oscillated to the position shown in Fig. 5 and with it the segment or stop 51, which then becomes effective to prevent the oscillation of the rocker 50 and the closer L. As soon as the full bucket-load is made up in the load-receiver G the valve 31 will be carried from the position shown in Fig. 5 into position to permit the opposite discharge edge thereof to deliver the supplemental supply-stream to the bucket G', (see Fig. 2,) and the flow of the drip-stream into the bucket G will be entirely cut off. As soon as this final cut-off of the drip-stream is effected the latch-tripper 29' will be in position to release the bucket-latch 29 27 and the stop-segment 51 will have been oscillated to permit the free movement of the locker 50 and allow the closer to open to discharge the load from the load-receiver G. (See Fig. 2.) The parts will now be in position to pass through another cycle of operations.

By the organization of a pair of automatic weighing mechanisms with an automatic gravitating meter in the manner herein stated I am enabled to produce a weighing apparatus in which the weighers will have a very much greater capacity than they would have if controlled by valve mechanism and interlocking devices of the usual construction, and this increase in capacity is obtained without affecting the precision with which the several weighing operations are performed.

By the term "weighing mechanism" is meant the load-receiver or bucket and its accessories and the beams by which said parts are supported.

Many changes could be made in the details of the various parts, and the invention is not limited to a meter having an oscillating or rocking movement.

No claim is herein made to "the combination with a movable meter having a plurality of separately-dischargeable chambers, of automatic weighing mechanism having a plurality of buckets loadable, respectively, by the respective chambers of said meter; and means operative with the weighing mechanism for controlling the action of said meter," for such subject-matter is set forth and claimed in my pending application, filed June 24, 1896, Serial No. 596,731.

Having described my invention, I claim—

1. The combination, with a movable meter having a plurality of chambers, of weighing mechanism having a plurality of load-receivers loadable by the chambers of said meter; and means operative by a part of the weighing mechanism for controlling the action of said meter.

2. The combination, with a movable meter having a plurality of successively-dischargeable chambers, of automatic weighing mechanism having a plurality of buckets loadable, respectively, by the respective chambers of said meter; and means operative by a part of the weighing mechanism for controlling the action of said meter.

3. The combination, with a gravitating meter having a plurality of separately-dischargeable chambers, of a valve for closing the discharge ends of said chambers, successively; an automatic weighing mechanism having a plurality of buckets loadable, respectively, by said respective chambers; and means operative by a part of the weighing mechanism for controlling the action of said meter.

4. The combination, with an oscillating meter, of automatic weighing mechanism having a plurality of buckets loadable by said meter; and means operative by a part of the weighing mechanism for controlling the action of said meter.

5. The combination, with an oscillatory double-chambered meter, of an automatic weighing mechanism having a pair of buckets loadable, alternately, by the respective chambers of said meter; and means operative by a part of the weighing mechanism for controlling the action of said meter.

6. The combination, with an oscillatory gravitating double-chambered meter, of means for supplying material to such chambers, alternately; an automatic weighing mechanism having a pair of buckets loadable, alternately, by the respective chambers of said meter; and means operative by a part of the weighing mechanism for controlling the action of said meter.

7. The combination, with a double-chambered oscillatory meter, of a cut-off valve in position and adapted for cutting off the discharge from such chambers, alternately; an automatic weighing mechanism having a pair of buckets loadable, alternately, by the respective chambers of said meter; and means operative by the weighing mechanism for controlling the action of said meter.

8. The combination, with a double-chambered oscillatory meter, of a cut-off valve having its cut-off face defined by an arc struck from the center of oscillation of the meter and adapted for cutting off the discharge from said chambers, alternately; an automatic weighing mechanism having a pair of buckets loadable, alternately, by the respective chambers of said meter; and means operative with the weighing mechanism for controlling the action of said meter.

9. The combination, with a double-chambered oscillatory meter, of a pair of delivery-spouts in position and adapted to register, alternately, with the respective chambers of the meter; a stream-supporting valve between and connecting the receiving ends of said spouts for cutting off the discharge from said chambers, alternately; an automatic weighing mechanism having a pair of buckets loadable through said delivery-spouts; and means operative with the weighing mechanism for controlling the action of said meter.

10. The combination, with a meter having a pair of separately-dischargeable chambers, of a valve for closing the discharge ends of said chambers, alternately; a supplemental valve shiftable for supplying material to the buckets, alternately; means for supplying material to the meter and the supplemental valve, independently; and a pair of separately-loadable buckets.

11. The combination, with a meter having a pair of separately-dischargeable chambers, of a valve for closing the discharge ends of said chambers, alternately; a supplemental oscillatory valve shiftable about its axis for supplying material to the buckets, alternately; means for supplying material to the meter and the supplemental valve, independently; and a pair of separately-loadable buckets.

12. The combination, with a meter having a pair of separately-dischargeable chambers, of a valve for closing the discharge ends of said chambers, alternately; a supplemental valve for supplying material to the buckets, alternately; means for supplying material to the meter and the supplemental valve, independently; and a pair of separately-loadable buckets.

13. The combination, with a meter having a plurality of separately-dischargeable chambers, of automatic weighing mechanism having a plurality of buckets loadable, respectively, by the respective chambers of said meter; a valve shiftable for supplying material to said buckets, alternately; and means operative by the weighing mechanism for controlling the action of said meter.

14. The combination, with a pair of automatic weighing mechanisms, each having a bucket, of an oscillatory and axially-reciprocatory valve automatically shiftable by each of said mechanisms, respectively, into position for supplying material to the bucket of the other mechanism.

15. The combination, with a pair of main supply-spouts, of stream-controlling means for cutting off the supply of material to the supply-spouts, alternately; a pair of automatic weighing mechanisms having a pair of buckets controlled, respectively, by said respective spouts; a supplemental valve shiftable by each of said mechanisms, respectively, into position for supplying material to the bucket of the other mechanism; and a separate supply-spout for said supplemental valve.

16. The combination of a pair of automatic weighing mechanisms, each having a shiftable load-discharger and reciprocally-effective valve-opening-movement and load-discharging-movement limiters connected for movement in unison; and valve mechanism for supplying material to the buckets of said weighing mechanisms.

17. The combination of a pair of automatic weighing mechanisms, each having a shiftable load-discharger and reciprocally-effective valve-opening-movement and load-discharging-movement limiters and having said load-discharging-movement limiters connected for oscillation in unison about a common center; and valve mechanism for supplying material to the buckets of said weighing mechanisms.

18. The combination of a pair of automatic weighing mechanisms, each having a shiftable load-discharger and reciprocally-effective valve-opening-movement and load-discharging-movement limiters and having said load-discharging-movement limiters connected for oscillation in unison about a common center; and an oscillatory valve movable in unison with said load-discharging-movement limiters and adapted to supply material from its opposite ends, alternately, to the respective buckets.

19. The combination, with a pair of main supply-spouts, of stream-controlling means for cutting off the supplies of material to said supply-spouts, alternately; an oscillatory supplemental valve shiftable by each of the weighing mechanisms, respectively, into position for supplying material to the bucket of the other mechanism; a separate supply-spout for said supplemental valve; a pair of automatic weighing mechanisms, each having a bucket and a closer; and reciprocally-effective valve-opening-movement and closer-opening-movement limiters and having said closer-opening-movement limiters connected for oscillation in unison about the axis of and in unison with the supplemental valve.

20. The combination, with a pair of main supply-spouts, of stream-controlling means for cutting off the supplies of material to said supply-spouts, alternately; an oscillatory supplemental valve shiftable by each of the beam mechanisms, respectively, into position for supplying material to the bucket of the other mechanism; a separate supply-spout for said supplemental valve; and a pair of automatic weighing mechanisms, each having a closer, beam mechanism, and reciprocally-effective valve-opening-movement and closer-opening-movement limiters and having said closer-opening-movement limiters connected for oscillation about the axis of and in unison with the supplemental valve.

21. The combination, with a gravitating meter oscillatory between two positions and having a pair of separately-dischargeable chambers, of a cut-off valve in position and adapted for closing the discharge ends of said chambers, alternately; means for latching the meter in either of said positions; a pair of automatic weighing mechanisms loadable, alternately, by the respective chambers of said meter; and latch-tripping means for said meter operative, alternately, by said respective weighing mechanisms.

22. The combination, with a gravitating meter oscillatory between two positions and having a pair of separately-dischargeable chambers, of a cut-off valve in position and adapted for closing the discharge ends of said chambers, alternately; means for latching the meter in either of said positions; and a pair of automatic weighing mechanisms loadable, alternately, by the respective chambers of said meter and having closers and also having closer-operated latch-tripping means operative, alternately, for releasing the latching means of the meter.

23. The combination, with an automatic weighing-machine having beam mechanism, of an oscillatory meter in position and adapted for delivering its load to the weighing mechanism; independent means for supplying a drip-stream to said weighing mechanism; and beam-blocking means operative with said oscillatory meter.

24. The combination, with a double-chambered oscillatory meter, of a cut-off valve in position and adapted for closing the discharge ends of said chambers, alternately; a pair of automatic weighing mechanisms, each consisting of a poising mechanism and a bucket, loadable, alternately, by the respective chambers of said meter; independent means for supplying a drip-stream to said buckets; and meter-actuated means for blocking the descent of the poising mechanisms alternately.

25. The combination, with a double-chambered oscillatory meter, of a cut-off valve in position and adapted for closing the discharge ends of said chambers, alternately; a pair of automatic weighing mechanisms having beam mechanisms and also having buckets loadable, alternately, by the respective chambers of said meter; and meter-actuated blocking means operative for blocking the descent of the poising portions of the beam mechanism, alternately.

26. The combination, with a meter oscillatory between two positions and having a pair of separately-dischargeable chambers, of a cut-off valve in position and adapted for closing the discharge ends of said chambers, alternately; a pair of automatic weighing mechanisms each comprising beam mechanism and a bucket, loadable, alternately, by the respective chambers of said meter; and an oscillatory meter-actuated beam-locking device operative into position for engaging the poising portions of said beam mechanisms, alternately.

27. The combination, with a pair of automatic weighing mechanisms having buckets, closers, and latches for said closers and also having alternately-effective valve-actuators operative, respectively, at predetermined points in the descent of said respective buckets; of an oscillatory valve adapted for supplying material to said buckets, alternately, from its opposite ends, respectively, and oppositely operative by said respective valve-actuators; and latch-trippers movable in unison, respectively, with said respective valve-actuators and each operative for releasing its latch on the oscillation of the valve by its respective valve-actuator.

28. The combination, with a movable meter having separately-dischargeable chambers, of weighing mechanisms having a plurality of load-receivers loadable by the respective chambers of said meter; means for supplying a supplemental quantity of material to the weighing mechanisms; and means operated by the weighing mechanisms for controlling the action of the meter.

29. In a twin-bucket weighing apparatus, the combination of a meter having chambers arranged to discharge, respectively, into the buckets of the weighing mechanisms; and means operative by a part of the weighing mechanisms for controlling the action of the meter.

30. The combination, with twin-bucket weighing mechanisms, of an oscillating meter having chambers adapted to discharge, respectively, into the respective buckets of said weighing mechanisms; means for locking said meter in its extreme positions; means for supplying a supplemental quantity of material to the weighing mechanisms; and means operative by a part of the weighing mechanisms for releasing said meter.

31. The combination, with weighing mechanisms having a plurality of buckets, of a meter controlled by a part of each weighing mechanism and adapted to load said buckets successively; means for supplying a continuous supplemental stream of material; and means for shifting said stream successively into the respective buckets of the weighing mechanisms.

32. In an apparatus of the class specified, the combination, with the weighing mechanisms thereof, of registers for recording the loads respectively discharged from each of said weighing mechanisms; and a supplemental register coacting with said first-named registers and adapted to record the total number of loads weighed by the apparatus.

33. The combination, with a meter oscillatory between two positions and having a pair of separately-dischargeable chambers of a cut-off valve in position and adapted for closing the discharge ends of said chambers alternately; a pair of automatic weighing mechanisms having beam mechanisms, closers, and latches, and also having buckets loadable, alternately, by the respective chambers of said meter; meter-actuated beam-blocking means operative into position for engaging the poising portions of said beam mechanisms, alternately; and alternately-effective latch-trippers movable with said beam mechanisms, respectively, and operative, respectively, on the release of said respective beam mechanisms from said beam-blocking means.

FRANCIS H. RICHARDS.

Witnesses:
C. A. WEED,
CHARLES FINKLER.